Feb. 11, 1958     R. L. HAUG ET AL     2,823,369
CONDENSER STORAGE REGENERATION SYSTEM
Filed July 23, 1954     5 Sheets-Sheet 1

INVENTORS
ROY L. HAUG
CHARLES W. ALLEN
BY
ATTORNEY

Feb. 11, 1958  R. L. HAUG ET AL  2,823,369
CONDENSER STORAGE REGENERATION SYSTEM
Filed July 23, 1954  5 Sheets-Sheet 3

INVENTORS
ROY L. HAUG
CHARLES W. ALLEN
BY
John P. Dority
ATTORNEY.

Feb. 11, 1958

R. L. HAUG ET AL 2,823,369

CONDENSER STORAGE REGENERATION SYSTEM

Filed July 23, 1954

INVENTORS
ROY L. HAUG
CHARLES W. ALLEN

BY John P. Dority
ATTORNEY.

INVENTORS
ROY L. HAUG
CHARLES W. ALLEN
BY John P. Darity
ATTORNEY.

United States Patent Office 2,823,369
Patented Feb. 11, 1958

2,823,369

CONDENSER STORAGE REGENERATION SYSTEM

Roy L. Haug, San Jose, Calif., and Charles W. Allen, Endicott, N. Y., assignors to International Business Machines Corporation, New York, N. Y., a corporation of New York Application July 23, 1954, Serial No. 445,221

4 Claims. (Cl. 340—173)

This invention relates to a computing machine and more particularly to storage devices therefor. This application is a continuation in part of our application Serial No. 399,071, filed December 18, 1953.

In the past digital computing machines have employed storage systems using various types of storage elements such as magnetic cores, trigger tube pairs, condensers, etc. In such elements a bit of information is usually stored in the binary form, that is, by the establishment of either one or the other of two possible stable conditions. The present invention contemplates the use of such binary elements in a storage system.

It is accordingly an object of this invention to provide an improved storage system.

Another object of this invention is to provide a storage system of improved reliability.

Another object is to provide an improved storage system in which a low impedance driving source may be advantageously utilized.

Still another object is to provide an improved storage system having a high signal to noise ratio.

A further object is to provide an improved storage system having relatively large signal levels.

Another object of this invention is to provide a simplified and economical storage system utilizing standard electronic components.

A more specific object of this invention is to provide an improved method and apparatus for regenerating an initial condition of charge on a condenser.

Another more specific object of this invention is to provide an improved condenser storage system.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 1a and 1b constitute a schematic diagram, partly in block form, of a condenser storage system which embodies the principle of the invention.

Figs. 5 through 15, inclusive, are schematic showings of various circuit elements and the various block diagrams by which they are generally represented.

In the present system it has been chosen to represent digits in accordance with a 7-bit biquinary code. In this code seven binary elements are utilized to store a single digit. The first two elements respectively pertain to the binary bits B5 and B0. The next five elements respectively pertain to the quinary bits Q4, Q3, Q2, Q1 and Q0. Any of the digits can be represented by activating one element in the quinary level and one element in the binary level. For example, the digit 3, is represented by activating the B0 element and the Q3 element. The digit 7 is represented by activating the B5 element and the Q2 element. In this fashion each digit can be represented by two active elements, one in each level.

Figure 5:
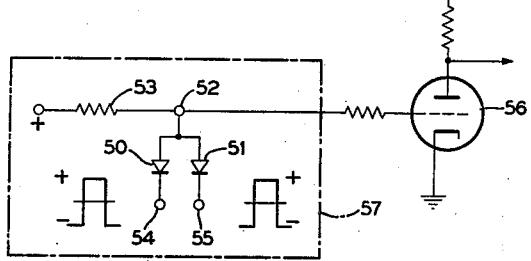
Figure 6:
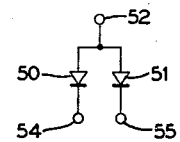

Attention will now be given to various typical forms of tube and diode circuits which are shown diagrammatically in Figs. 1a and 1b. In Fig. 5, for example, there is shown a typical coincidence switch, otherwise known as a logical "and" circuit, comprising the germanium crystal diodes 50 and 51. The common terminal 52 of the diodes 50 and 51 is connected through a voltage dropping resistor 53 to a source of positive voltage (not shown). The individual input terminals 54 and 55 of the diodes 50 and 51 are normally biased negatively so that the common terminal 52 is normally at a negative potential with respect to ground. If coincident positive pulses are applied to the terminals 54 and 55, the potential of the terminal 52 is raised. However, if only one of the terminals 54 and 55 is pulsed positively, the potential of the terminal 52 is not raised appreciably. A voltage responsive device, such as the electronic tube amplifier 56 is controlled by the potential of the terminal 52 to furnish a usable output voltage pulse whenever a coincidence of positive pulses is detected. For simplicity, the portion of the coincidence switch in the broken-line rectangle 57, Fig. 5, is generally represented as shown in Fig. 6, omitting the dropping resistor 53 and the connection to the positive voltage source.

Figure 7:
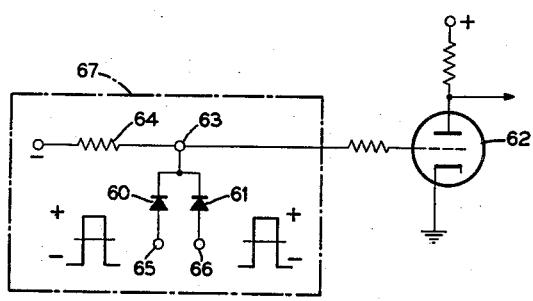
Figure 8:
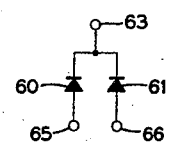

In Fig. 7, there is shown a typical mixer, otherwise known as a logical "or" circuit, comprising the diodes 60 and 61. Diodes which are employed in mixers are shaded in the present drawings to distinguish them from the diodes which are employed in switches. A voltage responsive device, represented by the electron tube amplifier 62 is controlled by the potential of the common output terminal 63 of the diodes 60 and 61, which terminal is connected by a resistor 64 to a source of negative voltage (not shown). If either one (or both) of the diode input terminals 65 and 66 is pulsed positively, the potential of the terminal 63 is raised. For convenience, the portion of the mixer circuit shown in the broken-line rectangle 67, Fig. 7, is generally represented as shown in Fig. 8, omitting the resistor 64 and the connection to the negative voltage source.

Figure 1A:
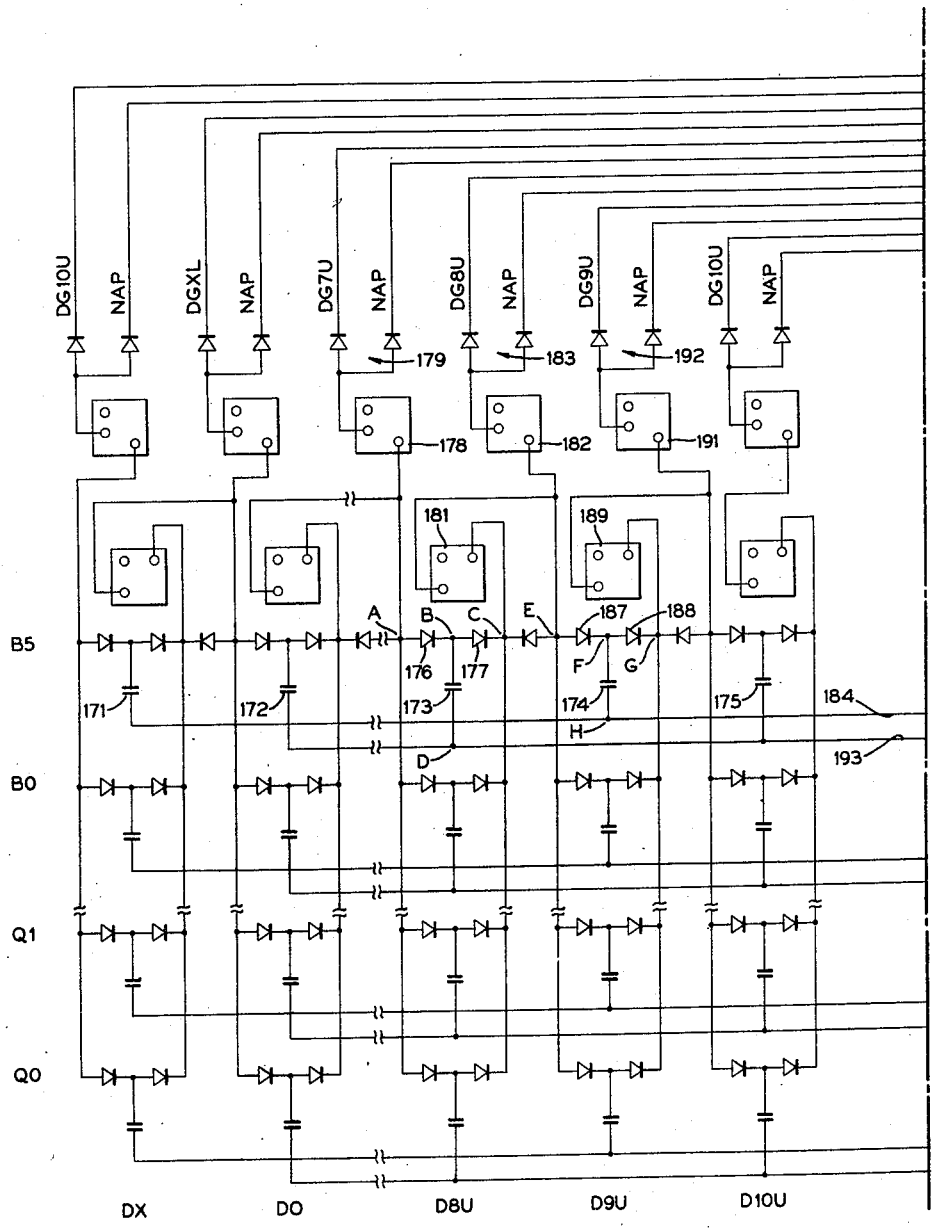
Figure 1B:
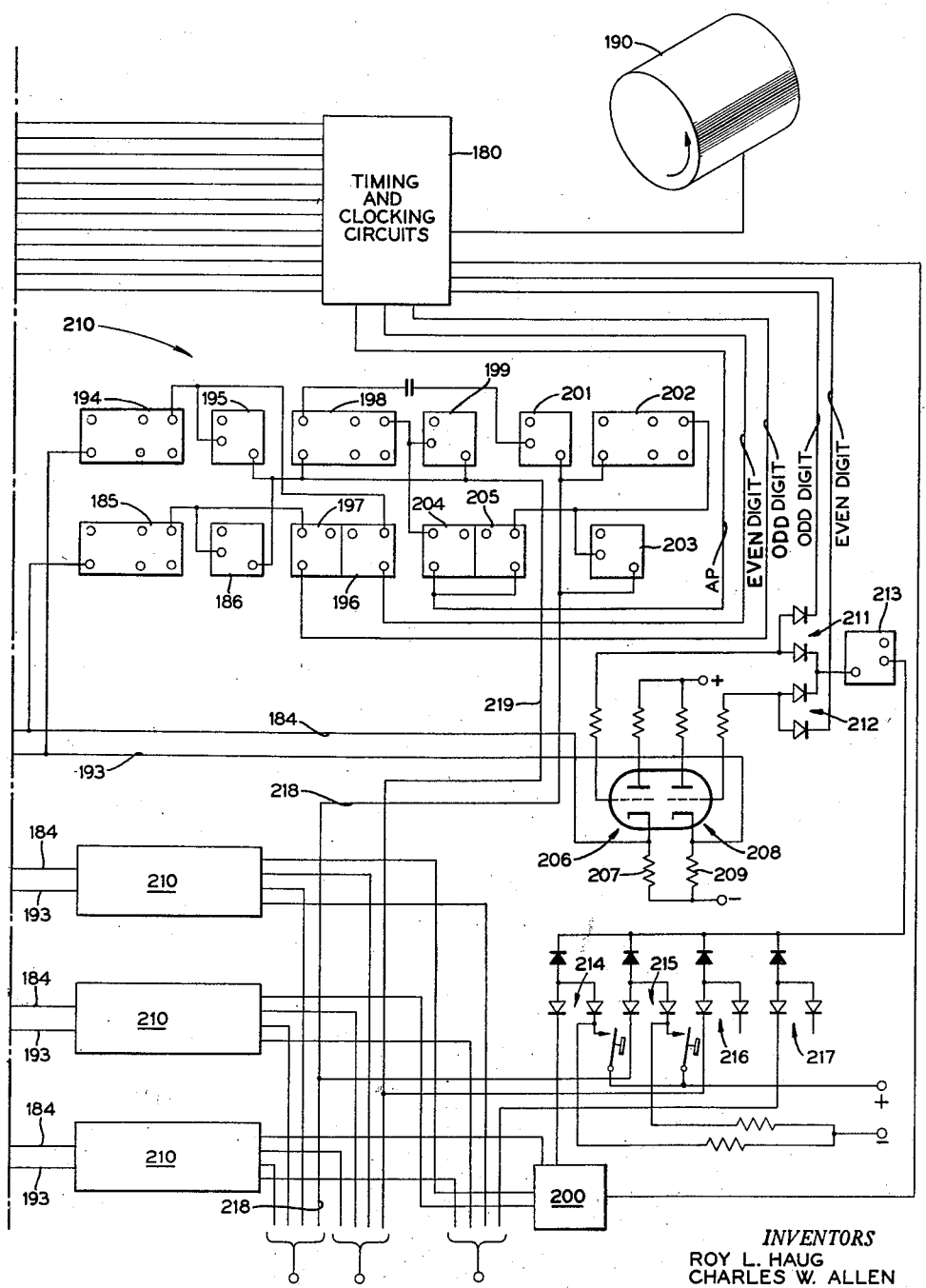
Figure 2:
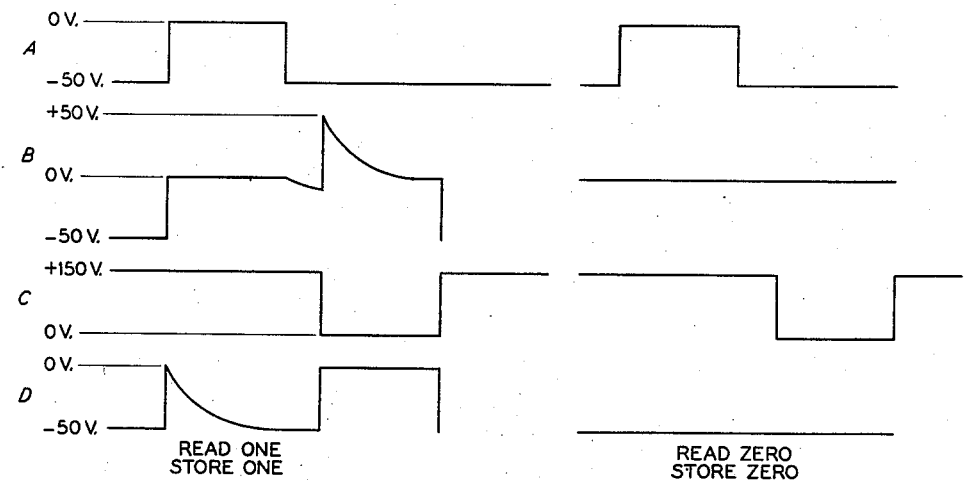
Fig. 2 is a graphical representation, to a common time base, of approximate wave forms which exist in various portions of the circuit of Figs. 1a and 1b, these portions being designated by the same alphabetical characters as the corresponding wave forms.
Figure 10:
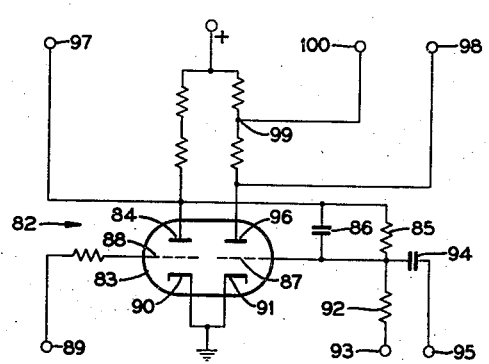
Figure 9:
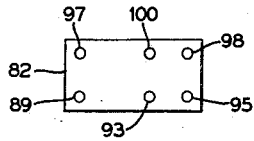

Various types of circuits are indicated by blocks in Figs. 1a and 1b. These circuits will be disclosed now in greater detail. Fig. 9, for example, represents in block or rectangle form a type of double inverter unit 82. This unit is shown schematically in Fig. 10, where it is seen to comprise a twin triode amplifier 83 in which the plate 84 of the first triode is coupled through a resistor 85 and capacitor 86 to the grid 87 of the second triode. The grid 88 of the first triode is connected to an input terminal 89. The cathodes 90 and 91 have a common ground connection as shown. The grid 87 is connected through a resistor 92 to a terminal 93 and is also coupled by a capacitor 94 to a terminal 95. Terminal 93 is normally connected to a source of negative voltage, not shown. The plates 84 and 96 of the first and second triodes, respectively, are connected to plate terminals 97 and 98. The plate circuit of the second triode also has a tap 99 connected to a plate tap terminal 100. The operation of the double inverters shown in Figs. 9 and 10 is such that when a positive pulse is applied to the input terminal 89, the resulting drop of voltage at the plate 84 is communicated to the grid 87, causing a rise in voltage at the plate 96. Hence, a positive output voltage pulse is available at the terminal 98 or 100, and a negative output pulse is available at the terminal 97. As will be explained subsequently, the double inverter shown in Figs. 9 and 10 is adapted to be used in conjunction with a cathode follower to provide a latch unit. When used in this fashion, the unit is turned "on" by a positive pulse applied to the input terminal 89, and it is turned "off" or reset by the application of a negative pulse to this terminal, or by the application of a positive pulse to terminal 93 or 95.

Figure 11:
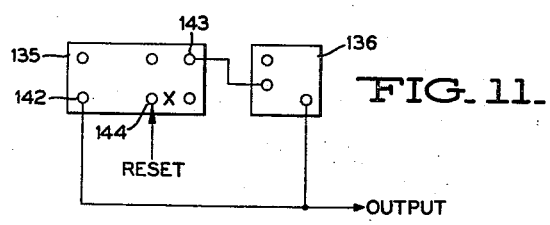

Fig. 11 shows one form of a latch unit that may be employed in the circuit of Figs. 1a and 1b. Certain other forms of latch units are disclosed and claimed in Patent No. 2,628,309, issued to Ernest S. Hughes, Jr., on February 10, 1953. The latch unit which is illustrated in Fig. 11 uses a double inverter 135 of the type shown in Figs. 9 and 10 above, and a cathode follower 136. In the normally "off" condition of the latch unit, the left-hand section of the double inverter 135 is cut off and the right-hand section thereof is conducting as indicated by the X in Fig. 11. The application of a positive pulse to the terminal 142 turns the unit "on." The positive output voltage at the terminal 143 is fed back through the cathode follower 136 to the input terminal 142, thereby maintaining the latch unit "on." The output of the latch unit is taken from the output side of the cathode follower 136. To reset the latch unit, a negative pulse is applied to the terminal 143, which negative pulse is transferred by the cathode follower to terminal 142.

Figure 12:
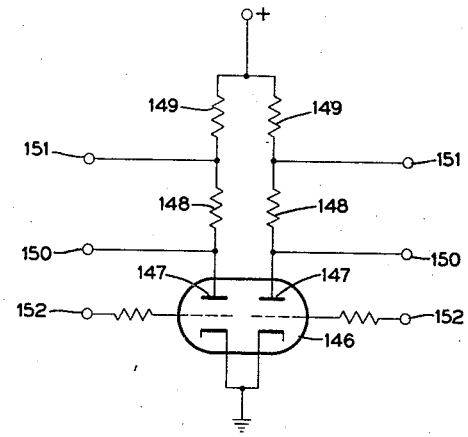
Figure 13:
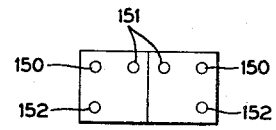

In Fig. 12, there are shown a pair of typical inverter amplifiers each comprising one-half of a double triode tube 146. The plates 147 of each half of tube 146 is connected through a pair of resistors 148 and 149 to a source of positive voltage, not shown. Each plate 147 has a plate terminal 150 and the junctions between resistors 148 and 149 each have a tap terminal 151. The grid of each half of tube 146 has a terminal 152 and the two cathodes are connected together and grounded as shown. It is seen from the above structure that each inverter may be used independently of the other. For convenience, the inverters shown schematically in Fig. 12 are generally represented as shown in Fig. 13.

Figure 14:
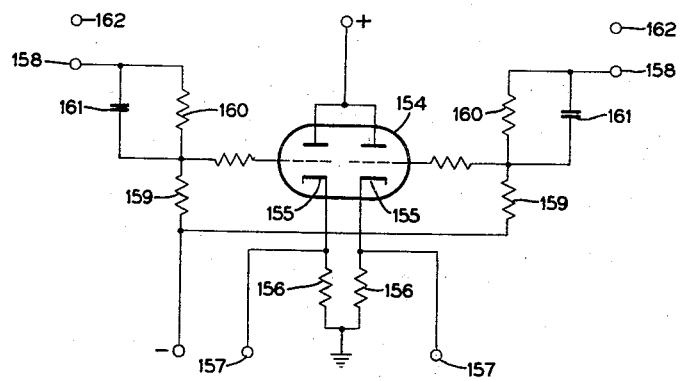
Figure 15:
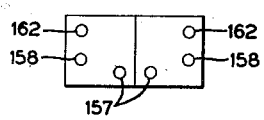

In Fig. 14, there are shown a pair of typical cathode follower circuits each comprising one-half of a double triode tube 154. The plates of each half of tube 154 are connected together and to a source of positive potential, not shown. The cathodes 155 of tube 154 are each connected through a resistor 156 to ground as shown. Each cathode 155 is provided with a terminal 157. The grids of tube 154 are each connected to a terminal 158 through a voltage level establishing network including resistors 159 and 160, a condenser 161, and a source of negative voltage, not shown, connected to resistor 159. The terminals 162 are not used in this cathode follower arrangement. From the above-described structure it may be seen that each cathode follower may be used independently of the other. For convenience the cathode followers shown schematically in Fig. 14 are generally represented as shown in Fig. 15.

Referring to Figs. 1a and 1b there is shown a matrix comprised of a number of condenser storage units and associated latch circuits. This matrix is adapted to handle data represented in the biquinary code, thus there are seven rows or levels of condenser storage elements designated B5, B0, Q4 through Q0, respectively. The present matrix has been chosen to store 22 digits, and accordingly 22 columns of condenser storage elements are provided, respectively designated DX, D0, D1L, D2L, D3L, and so on, through D10L (digit 10 lower) and D1U, D2U, and so on, through D10U (digit 10 upper). The condenser storage matrix is considered to be broken into two portions and it has been chosen to designate the two portions, the lower and the upper respectively.

In order to understand the operation of the matrix as a whole, single units will be first considered. In Fig. 1a the B5 level of condenser storage elements includes the condensers 171, 172, 173, 174 and 175. Each of these condensers is adapted to assume two stable states, namely, a charged state and an uncharged state. A condenser in the uncharged state is considered to have a "bit" stored therein and a condenser in the charged state is considered to have no "bit" stored therein. It is apparent that the opposite arrangement might equally as well have been chosen. Each condenser may thus be considered a binary element. Associated with condenser 173 are two rectifiers, or diodes, 176 and 177. The cathode of diode 176 is connected to the anode or plate of diode 177 and the junction of the two diodes is connected to one side of condenser 173 at point B. The plate of diode 176 is connected at the point A to the output of a cathode follower 178. The input to cathode follower 178 is connected to the output of a switch 179. The cathode of diode 177 is connected at point C to the output of an inverter amplifier 181. The input to inverter 181 is taken from the output of a cathode follower 182 and the input to cathode follower 182 is taken from a switch 183.

The opposite side of condenser 173 is connected to the line 193 at point D. Line 193 is connected to the input of a double inverter amplifier 194, Fig. 1b, and the output of amplifier 194 is connected to the input of a cathode follower 195.

Condenser 174, Fig. 1a, of the B5 level has associated therewith diodes 187 and 188. The cathode of diode 187 is connected to the anode of diode 188 and the junction of the two diodes is connected to one side of condenser 174 at point F. The anode of diode 187 is connected at point E to the output of cathode follower 182. The cathode of diode 188 is connected at point G to the output of an amplifier inverter 189. The input of inverter 189 is connected to the output of a cathode follower 191 and the input to cathode follower 191 is connected to the output of a switch 192. The opposite side of condenser 174 is connected to the input of a double inverter amplifier 185, Fig. 1b, and the output from amplifier 185 is connected to the input of a cathode follower 186. The input to cathode follower 195 is also connected to the output of an inverter amplifier 196 and the input to cathode follower 186 is additionally connected to the output of an inverter amplifier 197.

The outputs of cathode followers 186 and 195 are connected together and connected to the input of a double inverter 198 as described above in relation to Figs. 9 and 10. The output of the double inverter 198 is connected to the input of a cathode follower 199. The output of cathode follower 199 is connected back to the input of the double inverter 198 to form a latch circuit. The plate of the tube of the left-hand half of double inverter 198 is capacitively coupled to the input of a cathode follower 201. The output of cathode follower 201 is connected to the input of a double inverter 202 and the output of double inverter 202 is connected to the input of a cathode follower 203. The output of cathode follower 203 is connected back to the input of double inverter 202 to form a second latch circuit. The input to cathode follower 199 is also connected to the output of an inverter 204. The input to cathode follower 203 is likewise connected to the output of an inverter 205. The inputs to inverters 204 and 205 are connected together so that the output voltages from the two may be identical.

Line 184 is connected to the output of a cathode follower 206 having a cathode resistor 207 connected to a negative voltage source, not shown. Line 193 is likewise connected to the output of a cathode follower 208 having a cathode resistor 209 connected to a negative voltage source, not shown. The input to cathode follower 206 is taken from the output of a switch 211 and the input to cathode follower 208 is taken from the output of a switch 212. One side of switch 211 is connected to one side of switch 212 and the junction is connected to the output of a cathode follower 213. The outputs of switches 214, 215, 216 and 217 are mixed and fed to the input of cathode follower 213. The output of cathode follower 199 is connected to one side of switch 216 and the output of cathode follower 203 is connected to one side of switch 215.

In operation, if a condenser is required to remain in the charged state for any appreciable length of time the charge must be periodically regenerated thereon and if a condenser is to remain in the uncharged state for an appreciable length of time it is desirable to periodically remove any charge accumulated thereon to insure the maintenance of the original condition.

Figure 3:
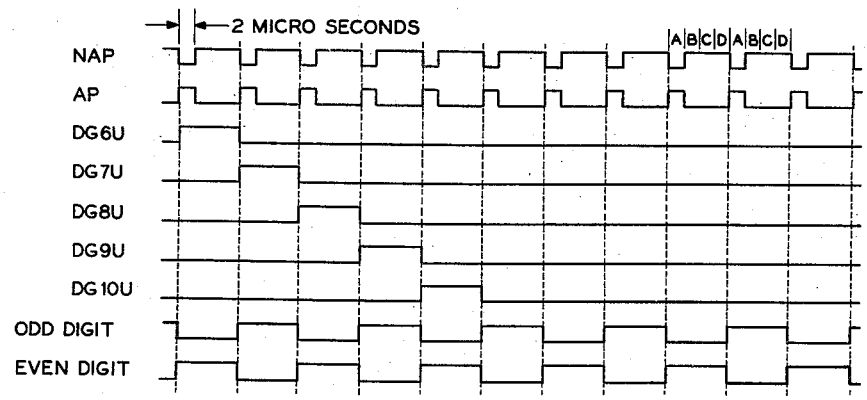
Fig. 3 is a diagram of the various clock pulses utilized by the circuit of Figs. 1a and 1b.

Assume that initially condenser 173, Fig. 1a, has no charge thereon and that it is desired to regenerate this state of the condenser and to convey a signal indicating the presence of a "bit" in this condenser. A DG7U (digit gate 7 upper) pulse is switched with a NAP (negative A pulse) at switch 179 to produce a gate pulse at digit 7 upper time extending form B time of digit 7 upper to A time of digit 8 upper at the input of cathode follower 178. These pulses are generated by timing and clocking circuits 180, Fig. 1b, under control of spots recorded on a rotating magnetic drum 190 according to well-known techniques, and these pulses may be seen in diagrammatic form at DG7U and NAP, respectively, in Fig. 3. It is to be noted that A time is used to designate the first one-fourth of a digit gate pulse, B time to designate the second one-fourth, C time to designate the third one-fourth, and D time to designate the last one-fourth of a digit gate pulse.

The output from cathode follower 178 raises the point A in potential and thus the anode of diode 176 for a duration of time from B time of digit 7U to A time of digit 8U. It should be noted that the points A and D are normally biased at the same negative potential and that the point C is normally biased at a positive potential. When the point A is raised in potential, diode 176 conducts and raises point B in potential. The rise in potential at point B is reflected across condenser 173 to point D. The rise in potential at point D causes a current to flow through resistor 209 at the cathode of cathode follower 208, Fig. 1b, to charge condenser 173. The rise in potential at point D and thus the rise in potential of line 193 causes an amplified output signal from amplifier 194 and an input signal to be fed to cathode follower 195. In response to this signal, e. g., the line 193 going positive, a positive output is produced from cathode follower 195 to turn the latch including double inverter 198 and cathode follower 199 to the "on" condition. This latch will be referred to hereinafter as the "early" latch. The early latch remains on until A time of the digit 8 upper pulse at which time it is turned off by the output from inverter 204. An A pulse is fed to the input of inverter 204 to cause a negative voltage to be produced at its output, thereby lowering the potential on the grid of cathode follower 199 to turn the early latch "off." As the early latch goes off a positive-going signal is produced at the plate of the left-hand tube of the double inverter 198 and this positive-going pulse is capacitively coupled to the input of cathode follower 201 to cause a positive-going output pulse from cathode follower 201 to be produced. This positive-going output pulse is fed to the input of double inverter 202 to cause a positive output pulse from inverter 202. This positive output pulse is fed to the input of cathode follower 203 to cause a positive output voltage to be fed back to the input of double inverter 202. Thus, the latch including double inverter 202 and cathode follower 203 in turned "on" at A time of digit 8 upper. This latch will be referred to hereinafter as the "on time" latch. An incremental time delay has thus been introduced and the above circuits may be considered to comprise a delay unit. The on time latch will remain on until A time of digit 9 upper, even though an A pulse is applied to the input of inverter 205 and a negative-going output is taken from inverter 205 and supplied to the input of cathode follower 203 during A time of digit 8 upper at the same time that the positive-going output from cathode follower 201 is supplied to the input of double inverter 202. The output from cathode follower 201 is longer in duration than the output of inverter 205 and thus the output from inverter 205 may be overridden.

Line 218 from the output of cathode follower 203 is thus provided with a positive pulse during digit 8 upper time in response to a bit being stored in the digit 8 upper position of the condenser storage matrix. Line 218 or the output of cathode follower 203 is connected to one side of switch 215. Since it is desired to regenerate the original condition or state of no charge on condenser 173 the other side of switch 215 is provided with a voltage gate to allow the pulse during digit gate 8 upper time appearing on line 218 to be fed to the input of cathode follower 213.

At the beginning of digit 8 upper time the DG7U pulse at switch 179, Fig. 1a, was removed, therefore, the cathode follower 178 ceased to conduct and the point A then returned to the normal negative level so that diode 176 can no longer conduct. During the A pulse of digit 8 upper time, point C remains at a positive potential while point D is at the negative potential level, since condenser 173 charged during digit 7 upper time. Point B is thus at a positive potential and diode 177 does not conduct appreciably. A DG8U pulse and a negative A pulse are switched at switch 183 and the resultant pulse, extending from B time of digit 8 upper to A time of digit 9 upper is fed to the input of cathode follower 182. The output of cathode follower 182 is fed to the input of inverter 181 causing a negative-going pulse to be produced at the output of inverter 181. The output pulse from inverter 181 goes from the positive potential to zero potential and thus point C goes to zero potential and diode 177 conducts since point B is at a positive potential. The positive-going input during digit 8 upper time to cathode follower 213, Fig. 1b, produces a positive-going output from cathode follower 213 which is switched at switch 212 with an even digit pulse. The resultant positive-going output pulse from switch 212 is supplied to the input of cathode follower 208. This positive-going voltage at the input of cathode follower 208 causes a voltage drop across resistor 209 and thus a positive-going pulse is supplied over line 193 to point D. The rise in potential at point D is reflected across condenser 173 to point B at the same instant of time that the point C drops from the positive potential level to the zero potential level, thus diode 177 conducts to discharge condenser 173. The drop across resistor 209 was of such magnitude as to cause line 193 to go to zero potential, approximately. Thus, the bit stored in condenser 173 has been regenerated or the no charge state of condenser 173 has been maintained and an indication has been read out that a bit was stored by the condenser.

Assume that initially condenser 174 has a charge thereon or is in the charged state indicating the absence of a "bit." Also during the interval from B time of digit 8 upper to A time of digit 9 upper the positive-going output from cathode follower 182 was supplied to point E and thus to the anode of diode 187. The point E thus went from the negative potential to the zero potential level. Since condenser 174 was initially charged, the point F is at approximately zero potential if none of the charge leaks from the condenser 174. If no charge has leaked from condenser 174 then diode 187 will not conduct appreciably, however, if some of the charge has leaked from condenser 174 diode 187 will conduct to bring the condenser back to its original charged state. The raising of point E to the zero potential level does not cause an appreciable signal or voltage rise to take place at point H and thus no appreciable signal will be fed over line 184 to the input of the double inverter 185. Thus, there will be no output from cathode follower 186 and the early latch will not be turned on during digit 8 upper time. Since the early latch is not turned on during digit 8 upper time no signal will be fed to cathode follower 201 during digit 9 upper time and the on time latch will not be turned on. Therefore, no signal will appear on line 218 during digit 9 upper time and no input will be supplied to cathode follower 213. No output can therefore come from switch 211 to cause cathode follower 206 to conduct. Line 184 is therefore not raised in potential during digit 9 upper time and the point H remains at the negative potential level. A DG9U pulse and a NAP are switched at switch 192 to provide a positive-going input to cathode follower 191. The output of cathode follower 191 is taken to the input of inverter 189. The output of inverter 189 is supplied to point G to lower point G in potential to approximately the zero level. Since the point F remains at zero potential in the absence of a positive pulse on line 184 then diode 188 does not conduct to discharge condenser 174 and the charge has thereby been regenerated on condenser 174, or, its initial state has been restored. During digit 8 upper time, as explained above, no pulse appeared on line 218, therefore, the absence of an output from the condenser storage matrix indicates that condenser 174 was in a charged state or that no bit was stored in the binary 5 level of the digit 9 upper portion of the condenser matrix. It is to be noted that the inverter 197 has an odd digit pulse supplied thereto and the inverter 196 has an even digit pulse supplied thereto. Since the output of inverter 197 is connected to the input of cathode follower 186, it is not possible for an output pulse to be produced from cathode follower 186 during odd digit time and thus a signal appearing on line 184 at odd digit time in response to cathode follower 206 conducting cannot be transmitted to the input of double inverter 198 to turn the early latch on. Likewise the output of inverter 196 is supplied to the input of cathode follower 195 to insure that the early latch is not turned on in response to a signal produced at the output of cathode follower 208 and appearing on line 193 during even digit time.

It will be noted that the binary 5 level of the digit 9 upper order of the condenser storage matrix has been read out of simultaneously with the regeneration of the binary 5 level of the DG8 upper order of the matrix.

Assume that it is desired to read the information out of the condenser storage matrix and to replace it with new information. Information from a source 200 may be introduced through switch 214 or from an outside source, not shown, through switch 217. Assume again that condenser 173 is uncharged and condenser 174 is in the charged state. A DG7U pulse is switched with a NAP pulse at switch 179 and the resultant pulse is supplied to the input of cathode follower 178 to produce at its output a positive-going pulse from B time of digit 7 upper to A time of digit 8 upper. Point A is raised in potential and diode 176 conducts to charge condenser 173 through resistor 209. Condenser 173 will become charged before A time of digit 8 upper and point D will thus have returned to the negative potential level before the A time of digit 8 upper. As explained above the early latch is turned on at B time of digit 7 upper and remains on until A time of digit 8 upper at which time it is turned "off" by the A pulse supplied to the input of inverter 204 and from the output of inverter 204 to the input of cathode follower 199. As the early latch goes "off" a positive-going signal is produced at the output of cathode follower 201 to turn the on time latch on at B time of digit 8 upper. The on time latch will remain "on" until turned off by the A pulse supplied to the input of inverter 205 which causes a negative-going output signal from inverter 205 to be applied to the input of cathode follower 203. A positive-going pulse is thus produced on line 218 from B time of digit 8 upper to A time of digit 9 upper in response to the condenser 173 having no charge thereon. This signal may be conveyed over line 218 to indicate the initial no charge condition of condenser 173.

Since it is desired to introduce new information into the condenser storage matrix a positive-going signal will be applied to one side of switch 214 and the new information will be brought in on the other side of switch 214. For this operation the positive voltage is removed from the right-hand input to switch 215. Digit 8 will be brought in at digit 8 upper time and if digit 8 requires that no bit be stored at the binary 5 level of the digit 8 upper order of the condenser storage matrix then no signal will be produced at the output of switch 214. Since an entry of new information is called for, the switch 215 will have applied thereto no signal indicating the regeneration operation. Thus no input signal is provided at cathode follower 213 and no output signal is produced from cathode follwer 213 to be mixed with the even digit pulse at switch 212. Thus no input is provided for cathode follower 208 and no voltage drop takes place across resistor 209 and line 193 thus remains at the negative potential level. A DG8U pulse is switched with a NAP at switch 183 to produce a positive-going input to cathode follower 182 thus causing a positive-going output from cathode follower 182 to produce a positive-going input to inverter 181. This produces a negative-going output from inverter 181 extending from B time of digit 8 upper to A time of digit 9 upper which causes point C to drop in potential to the zero level.

Since point B is at zero potential in the absence of a positive-going voltage pulse on line 193, diode 177 does not conduct to discharge condenser 173 and the charge remains thereon to indicate the absence of a bit stored at the binary 5 level of the digit 8 upper order of the condenser storage matrix. The positive-going output from cathode follower 182 extending from B time of digit 8 upper to A time of digit 9 upper is also applied to point E to cause the charge on condenser 174 to be brought to its initial level if it had previously partially leaked off. This causes no appreciable rise in voltage at point H and thus no appreciable signal is applied to the input of the double inverter 185. No output is taken from double inverter 185 to the input of cathode follower 186 and thus the early latch is not turned on. Since the early latch is not turned on, the on time latch will not be turned on during digit 9 upper time. Since the on time latch was not turned on during digit 9 upper time, no signal will appear on line 218, and the absence of this signal indicates that no bit was stored in the binary 5 level of the digit 9 upper order of the condenser storage matrix and this information may be conveyed as desired to indicate this fact. Assume that the new information contains a bit in the binary 5 level of the digit 9 upper, then a positive-going signal will appear during digit 9 upper time on one side of switch 214 and be switched with the "read-in" signal appearing on the other side of the switch 214 to cause cathode follower 213 to conduct and produce a positive-going signal at the output of cathode follower 213 at digit 9 upper time. At digit 9 upper time the odd digit pulse is applied to one side of switch 211 and the other side of switch 211 has applied thereto the output of cathode follower 213 which, in this instance, is a positive-going pulse as a result of the new information being switched at switch 214 to the cathode follower 213. A digit 9 upper time the input to cathode follower 206 is a positive-going signal and thus a drop will be produced across resistor 207 to raise line 184 in potential. This raises point H in potential and this rise in potential is reflected across condenser 174 to the point F. At B time of digit 9 upper, point G will drop in potential from the positive potential level to zero potential, and, since point F rose in potential from the zero level to the positive level as a result of point H rising from the minus potential level to the zero potential level, diode 188 will conduct to discharge condenser 174. Thus a bit has been entered into the binary 5 level of the digit 9 upper order of the condenser storage matrix to replace the no bit condition existing prior thereto. It is to be noted that the information previously standing in the binary 5 level of the digit 9 upper order of the condenser storage matrix has been read out simultaneously with the entry of new information into the binary 5 level of digit 8 upper order of the condenser storage matrix.

All the orders of the condenser storage matrix operate in a manner similar to that described above and will therefore be described in no further detail here.

Each of the levels of an order of the condenser storage matrix is connected in parallel with the other levels of that order so that the entry or readout from the 7 levels of an order is in parallel.

Each of the levels, the B0, Q4, Q3, Q2, Q1, and Q0, operates in the same manner as the B5 level, and the part of the circuitry associated with these last 6 levels is shown in block form at 210 since it is identical with the circuitry 210 associated with the B5 level.

If it is desired to shift the information stored in the condenser storage matrix one position to the left it is merely necessary to take the output from the early latch over line 219 and switch it at switch 216 with a positive-going voltage pulse. This may be accomplished as follows: Assume that condenser 174 is initially discharged. At B time of the DG8 upper pulse a signal will be produced on line 184 to turn the early latch "on." As the early latch goes on line 219 rises in potential and this rise in potential is switched at switch 216 with a left shift pulse and supplied to the input of cathode follower 213. At DG8 upper time there is supplied to one side of switch 212 an even pulse. The other side of switch 212 is connected to the output of cathode follower 213 and thus from B time of digit 8 upper until A time of digit 9 upper a positive potential is supplied to the input of cathode follower 208 to produce a positive pulse for this same duration of time on the line 193. The positive pulse on line 193 raises the potential at point D and thus the potential of point B. Prior to the above, assuming that there was initially a charge on condenser 173, at B time of digit 7 upper, point A was raised in potential to charge condenser 173 to the predetermined level. The rise in potential at point D causes condenser 173 to be discharged during the interval from B time of digit 8 upper to A time of digit 9 upper, and thus condenser 173 is left with no charge stored thereon. It is seen that this is the condition initially of condenser 174, and that the condition of condenser 174 has been transferred to condenser 173. The information contained at the binary 5 level of the digit 9 upper order of the condenser storage matrix has been transferred to the binary 5 level of the digit 8 upper order of the condenser storage matrix, or, in other words, has been shifted left one order.

The condenser storage matrix is capable of having a word stored in its lower portion or of having a word stored in its upper portion, and either may be regenerated therein as long as is desired. Alternately, the condenser storage matrix may have information entered into it or read from it, or may have the information standing therein shifted to the left. It is also seen that information may be read from the condenser storage matrix at the same time that the information is regenerated therein. The condenser storage matrix may also have information read therefrom at the same time that new information is being entered into the same order.

Figure 4:
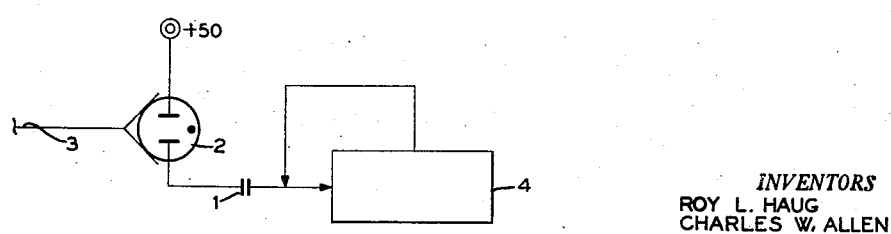
Fig. 4 is a modified form of one of the storage elements shown in Figs. 1a and 1b.

Referring to Fig. 4 there is shown a modified form of one of the storage elements shown in Figs. 1a and 1b. This element includes a condenser 1 and a gas diode 2 adapted to be fired by a pulse of radio frequency energy applied over lead 3. Clocking circuits 180, Fig. 1b, may control the input of radio frequency energy over lead 3. The regeneration circuits 4 are identical with those shown in Figs. 1a and 1b.

While there have been shown and described and pointed out the fundamental novel features of the invention as applied to a single modification, it will be understood that various omissions and substitutions and changes in the form and details of the device illustrated and its operation may be made by those skilled in the art without departing from the spirit of the nivention. It is the intention, therefor, to be limited only as indicated by the scope of the following claims.

What is claimed is:

1. In a storage device, the combination of a condenser, a resistor, first circuit means including a first rectifier for charging said condsenser through said resistor to a predetermined level during a first increment of time so that a signal is generated across said resistor in the absence of an initial charge on said condenser, second circuit means including a second rectifier and adapted to discharge said condenser during a second increment of time, and means responsive to a generated signal for causing a current to pass through said resistor during said second increment of time to condition said condenser to be discharged by said second circuit.

2. A condenser storage device comprising in combination, a condenser having first and second plates, a resistor connected to the first plate of said condenser, a first diode having a cathode and an anode, means for connecting the cathode of said first diode to the second plate of said condenser, a second diode having a cathode and an anode, means for connecting the anode of said second diode to the second plate of said condenser, means for applying a positive-going voltage pulse to the anode of said first diode during a first increment of time to cause said condenser to charge to a predetermined level through said resistor so that a signal is generated across said resistor in the absence of an initial charge on said condenser, means responsive to a generated signal for causing a current to flow through said resistor during a second increment of time to raise the potential of said first plate of said condenser and thereby raise the second plate of said condenser in potential, and means for applying a negative-going voltage pulse to the cathode of said second diode during the second increment of time to thereby discharge said condenser.

3. A condenser storage device comprising in combination, a condenser, a resistor connected in series with said condenser, switching means for connecting said condenser to a source of potential during a first increment of time and during a second increment of time to charge said condenser to a predetermined level through said resistor during the first increment of time so that a signal is generated across said resistor in the absence of an initial charge on said condenser, means responsive to a generated signal for causing a current to flow through said resistor during the second increment of time to raise the junction between said condenser and said resistor in potential so that said condenser is discharged during the second increment of time if said condenser was initially discharged.

4. Apparatus according to claim 3, characterized further by the fact that said switching means comprises a pair of serially connected diodes.

No references cited.